United States Patent
Kavanagh

(10) Patent No.: US 6,748,434 B2
(45) Date of Patent: Jun. 8, 2004

(54) ADAPTIVE NODE SELECTION

(75) Inventor: Alan Kavanagh, Walnut Creek, CA (US)

(73) Assignee: Ericsson Inc., Plano, TX (US)

( * ) Notice: Subject to any disclaimer, the term of this patent is extended or adjusted under 35 U.S.C. 154(b) by 174 days.

(21) Appl. No.: 09/955,797

(22) Filed: Sep. 18, 2001

(65) Prior Publication Data

US 2003/0055954 A1 Mar. 20, 2003

(51) Int. Cl.[7] .............................................. G06F 15/173
(52) U.S. Cl. ........................ 709/224; 709/226; 709/239; 709/242
(58) Field of Search ................ 709/223–224, 709/226, 238–242, 245

(56) References Cited

U.S. PATENT DOCUMENTS

| | | | |
|---|---|---|---|
| 2002/0032761 A1 * | 3/2002 | Aoyagi et al. ............... | 709/223 |
| 2002/0059407 A1 * | 5/2002 | Davies ........................ | 709/223 |
| 2002/0078229 A1 * | 6/2002 | Lindemann et al. ......... | 709/238 |
| 2002/0188714 A1 * | 12/2002 | Bouthors .................... | 709/223 |
| 2003/0026230 A1 * | 2/2003 | Ibanez et al. ............... | 370/338 |
| 2003/0037143 A1 * | 2/2003 | Kapoor ....................... | 709/226 |

FOREIGN PATENT DOCUMENTS

| | | | |
|---|---|---|---|
| WO | WO 99 60459 A | | 11/1999 |
| WO | WO 00 14981 A | | 3/2000 |
| WO | WO0028713 | * | 5/2000 |
| WO | WO0041414 | * | 7/2000 |

OTHER PUBLICATIONS

J. Cai et al., "General Packet Radio Service in GSM", Communications Magazine, IEEE, vol. 35, Issue 10, Oct. 1997, pp. 122–131.*

* cited by examiner

Primary Examiner—Hosain Alam
Assistant Examiner—Oanh Duong

(57) ABSTRACT

Methods, systems and arrangements enable an adaptive node selector (e.g., an adaptive domain name server (DNS)) to monitor network nodes and/or links/interfaces therebetween/thereof to facilitate connections to and through network nodes and over network links that are available/up. The adaptive node selector may include a nomenclature-nodal address mapper/filtering data structure in which one or more entries indicate whether network node(s) and/or network link(s) used to route through and/or to the node of the nodal address is/are functioning properly. The adaptive node selector may monitor the network by, for example, polling various elements of the network. In certain embodiment(s), the adaptive node selector may include a location/origin based filter, an event logger for logging various monitored functioning and non-functioning occurrences, and a filter for returning IP address(es) responsive to queries for available/up interfaces/links.

18 Claims, 4 Drawing Sheets

ADAPTIVE NODE SELECTION

BACKGROUND OF THE INVENTION

1. Technical Field of the Invention

The present invention relates in general to the field of communications, and in particular, by way of example but not limitation, to network node selection that adapts to network conditions.

2. Description of Related Art

When a user of the Internet today begins looking for a web site, he or she specifies a symbolic name such as "www.my.isp.com". However, the computer and the underlying protocols used to connect the user to this web site do not understand symbolic names, for they only understand Internet Protocol (IP) addresses, i.e. logical names. Consequently, some mechanism is needed to convert the human-understandable symbolic name to a computer-understandable logical name such as an IP address of a web server. This method of mapping symbolic names to logical names using a, e.g., distributed database is known as the Domain Name System (DNS).

The DNS is currently used in, for example, General Packet Radio Service (GPRS) and so-called Third Generation (3G) networks. For simplicity, the GPRS network shall be relied on for examples and illustration purposes. In a GPRS network, there are Serving GPRS Support Nodes (SGSNs) and Gateway GPRS support nodes (GGSNs). The SGSNs are connected to the GGSNs through what is known as the Gn interface/network, and each of the GGSNs are connected to an external Packet Data Network (PDN) (e.g., Internet Service Provider (ISP), corporate network, etc.) through what is known as the Gi interface/network.

The DNS is used in GPRS networks as follows: When a mobile station (MS) user attaches to the GPRS network, he or she typically specifies what is known as the Access Point Name (APN), which is used to specify the external PDN to which the MS wishes to connect. The APN links a name to a list of possible GGSN IP addresses that are connected to the external PDN that the MS specified in its PDP Context Activation.

The SGSN queries the DNS Server for a mapping of the APN (typically specified by the MS) to GGSN IP addresses. The DNS server responds to the DNS query by returning a list of possible GGSN IP addresses. The SGSN then "chooses" the first IP address in the list and attempts to establish a GTP tunnel/session with this GGSN via the Gn interface/network, and then the GGSN connects the MS to the external PDN requested via the Gi interface/network.

If the SGSN is unsuccessful in establishing a GTP tunnel/session with the first GGSN in the list, it traverses the list it received from the DNS server by attempting to establish a GTP Tunnel with the next GGSN in the list. This procedure is repeated until the SGSN successfully establishes a GTP Tunnel with a GGSN or until the list is exhausted, i.e., the end of the list is reached.

BRIEF SUMMARY OF CERTAIN EMBODIMENT(S) OF THE INVENTION

The prior art is improved by the methods, systems, and arrangements of the present invention. For example, as heretofore unrecognized, it would be beneficial to update a nomenclature-network address selection response based on current network conditions. In fact, it would be beneficial if addresses and/or routings were provided to requesters only if related network elements were thought to be available.

Methods, systems and arrangements enable a node selector (e.g., an adaptive domain name server (DNS)) to monitor the network to facilitate routing to/through network nodes and over network links that are functioning and/or that are geographically/location efficient. Such an adaptive node selector may include a nomenclature-nodal address mapper and/or filtering data structure in which one or more fields and/or filters indicate whether network node(s) and/or network link(s) (e.g., as representable by key IP addresses) used to route through and/or to the node of the mapped nodal address is/are available/up.

In certain embodiments(s), the monitoring may be effectuated by polling (polling via, SNMP and/or ICMP) the network and acting according to what is ascertained from the results of monitoring the, e.g., key IP addresses in the network. Monitoring may also be achieved by keeping state of the network through the use of Dynamic Routing Protocols such as RIP, OSPF and BGP and acting accordingly to what is monitored.

In certain embodiment(s), the adaptive node selector may also include a filter. More specifically, an adaptive node selector filter may be based on any one or more of different criteria. For example, the criteria may be based on the source of the query, a given fixed number of addresses to return, etc. Also, the adaptive node selector may group addresses based on different nodal criteria such as geographical location, functionality, or capacity.

In certain embodiment(s), the network may be a general packet radio service (GPRS) and/or 3G network, while (i) the network nodes may be Serving GPRS Support Nodes (SGSNs) and Gateway GPRS Support Nodes (GGSNs) and (ii) the network links may be Gn and Gi links, of which key IP addresses on these links may be monitored to ascertain if the connection to the network through these links is available/up or unavailable/down.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the methods, systems, and arrangements of the present invention may be had by reference to the following detailed description when taken in conjunction with the accompanying drawings wherein.

DETAILED DESCRIPTION OF EXEMPLARY EMBODIMENTS OF INVENTION

Figure 1:
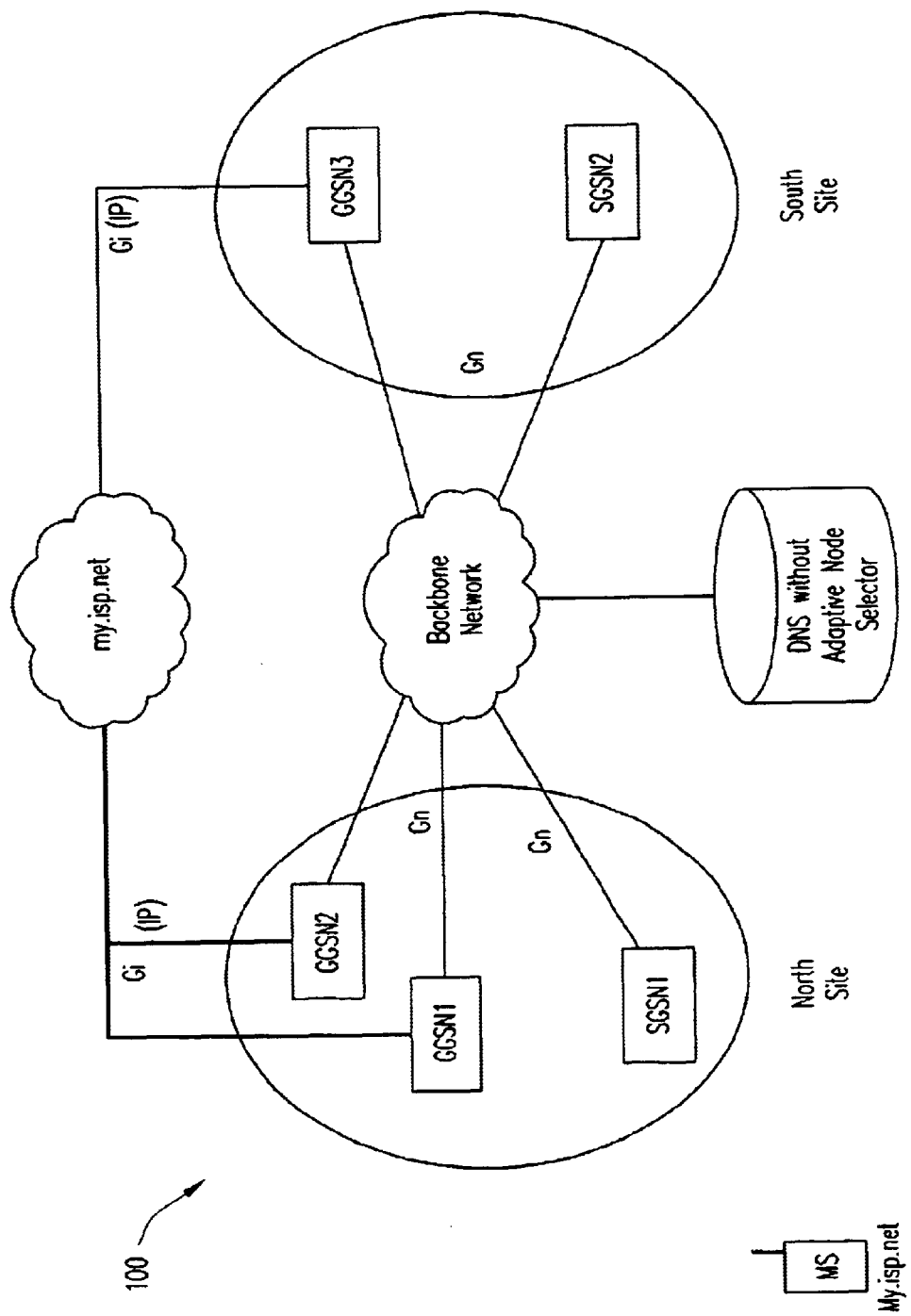
FIG. 1 illustrates an exemplary GPRS network environment using a standard DNS server.

In the following description, for purposes of explanation and not limitation, specific details are set forth, such as particular information exchanges, nodal arrangements, logic modules (implemented in, for example, software, hardware, firmware, some combination thereof, etc.), techniques, etc. in order to provide a thorough understanding of the present invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail. It should be understood that the term "module" as used herein embraces, subsumes, and includes, inter alia, object oriented programming techniques as well as so-called traditional programming techniques such as, for example, custom-developed applications.

Exemplary embodiment(s) of the present invention and its advantages are best understood by referring to FIGS. 1–4 of the drawings, like numerals being used for like and corresponding parts of the various drawings.

Aspects of the General Packet Radio Service (GPRS) are used below to describe certain embodiment(s) of the present invention and the usefulness of the invention in, for example, GPRS and 3G networks. However, it should be understood that the principles of the present invention are applicable to other network standards (or systems), especially those in which a communication may be directed through or to more than a single node. For example, the principles of the present invention may be applied to a global communications network, such as the Internet.

Standard DNS implementations present several problems for GPRS and 3G networks. For example, standard DNS implementations utilize a static database. The standard DNS servers therefore have no way of knowing the status of an address associated with a given APN. A standard DNS server consequently returns an address regardless of the state of the node of the address that is being returned in response to the received DNS query. Standard DNS servers also indiscriminately return all IP addresses associated with a given name. This may result in inefficient routing of GGSN connections from the SGSN via the Gn interface. Furthermore, a standard DNS server may direct an SGSN to a more distant GGSN, in another site, even though a local GGSN that is in the same site as the SGSN in question could provide access to the requested external PDN.

In other words, a standard DNS server returns all possible IP addresses (i.e., GGSNs) for a given APN to the inquiring SGSN. The addresses are returned regardless of whether the GGSN's Gi and/or Gn interfaces are available/up or unavailable/down.

When the SGSN successfully establishes a connection to a GGSN after traversing the list of GGSN IP addresses returned from a standard DNS server, there is no guarantee that the current GGSN's Gi interface is available/up. If the GGSN's Gi interface is unavailable/down, the MS is unable to send and/or receive traffic to/from the external PDN it specified in its PDP Context Activation process (even though there is a connection between the SGSN and the GGSN). As a result, the MS deactivates its current PDP Context and tries to re-establish a new PDP Context, but the standard DNS server is unaware of the current status of the GGSN's Gi interfaces so the SGSN may connect the MS to the same GGSN, whose Gn interface is available/up while its Gi interface is still unavailable/down.

A standard DNS Server may also cause an inquiring SGSN to connect to a GGSN that is in another site, even when a connection to the requested external PDN is available through a GGSN that is in the same site as the inquiring SGSN that is currently serving a requesting MS. This scenario is further detailed and explained hereinbelow with reference to FIG. 1.

Referring now to FIG. 1, an exemplary GPRS network environment using an exemplary DNS server is illustrated generally at 100. In the exemplary GPRS network environment 100, an MS is illustrated as being in wireless communication with an SGSN. The two (2) SGSNs (e.g., SGSN1 and SGSN2) and the three (3) GGSNs (e.g., GGSN1, GGSN2, and GGSN3) are illustrated as being connected to the backbone network of the GPRS network via Gn links/interfaces. GGSN1, GGSN2 and GGSN3 are illustrated as being connected to an external Packet Data Network (e.g., "my.isp.net") via Gi links/interfaces. The Gi links may be compatible with, for example, the Internet Protocol (IP). An exemplary DNS server is illustrated as being connected to the backbone network.

Consider that the GGSN1 and GGSN3 Gn interfaces are down/unavailable and that the GGSN2 Gi interface is down/unavailable. The MS is currently connected to SGSN1 in the North Site and is requesting a connection to the ISP network by specifying the APN "my.isp.net" in its PDP Context Activation.

The SGSN1 sends a DNS query to the DNS server over the GPRS backbone and waits for the APN symbolic name "my.isp.net" to be resolved. The DNS server returns the list of IP addresses (i.e., GGSNs) for the APN. The order of the list returned to the SGSN1 is typically random (e.g., GGSN1, GGSN3, GGSN2). The DNS server returns all IP addresses even though (i) some of these GGSNs are unavailable/down on the Gn and/or Gi links/interfaces and (ii) the location/origin of the request and what is the most preferable address(es) to return given the current status of the network and location of the origin of the DNS query is not considered.

The SGSN1 attempts to establish a GTP Tunnel with the first GGSN in the list, namely GGSN1 in this example. The SGSN1 is unsuccessful since GGSN1's Gn links/interfaces are down/unavailable. The SGSN1 then attempts to establish a GTP Tunnel with the next GGSN in the list, namely GGSN3, even though it is located in the South Site. The SGSN1 is unsuccessful in establishing a GTP Tunnel with GGSN3 because its Gn link/interface is unavailable/down. The SGSN1 then tries the last GGSN in the list, namely GGSN2. The SGSN1 successfully establishes a GTP Tunnel with the GGSN2 because its Gn links/interfaces are available/up. However, the MS is unable to connect to the ISP network (the external PDN "my.isp.net" in this example) because the GGSN2's Gi interfaces are unavailable/down, and, as a result, the MS is unable to send and/or receive traffic from the ISP network (the APN "my.isp.net"). The MS delete its PDP Context Activation from SGSN1, and in turn the SGSN1 terminates its GTP session with GGSN2.

Consider that, in the meantime, the status of the network has changed. GGSN2's Gi links/interfaces have changed status to available/up and GGSN3's Gn interfaces have changed status to available/up. Consequently, both GGSN2 and GGSN3 now have their Gn and Gi links/interfaces available/up. A standard DNS server having a static database is unaware of the change of status in the network, and it therefore does not take action accordingly. The MS is currently connected to SGSN1 in the North Site and is requesting a connection to the ISP network by specifying the APN "my.isp.net" in its PDP Context Activation.

The SGSN1 sends the DNS query to the DNS server in the GPRS backbone looking for the APN symbolic name "my.isp.net" to be resolved. The DNS server returns the list of IP addresses (i.e., GGSNs) for the APN. The order of the list returned to the SGSN1 is typically random (e.g., GGSN1, GGSN3, GGSN2).

The SGSN1 attempts to establish a GTP tunnel with the first GGSN in the list (namely, GGSN1) and is unsuccessful, as GGSN1's Gn interfaces are unavailable/down. The SGSN1 then attempts to establish a GTP connection with the next GGSN in the list, namely GGSN3. The SGSN1 in the North Site successfully establishes a GTP Tunnel with GGSN3 in the South Site, and the MS transmits and receives data from the external PDN, even though the GGSN2 in the North Site has both its Gn and Gi links/interfaces available/up. The SGSN1 has thus connected to a distant GGSN in another Site even though GGSN2, which is in the same site as SGSN1, was available/up at the time of the request. This causes an inefficient routing from SGSN1 in the North Site to the GGSN3 in the South Site, in spite of the fact that the GGSN2 in the North Site was available.

Figure 2:
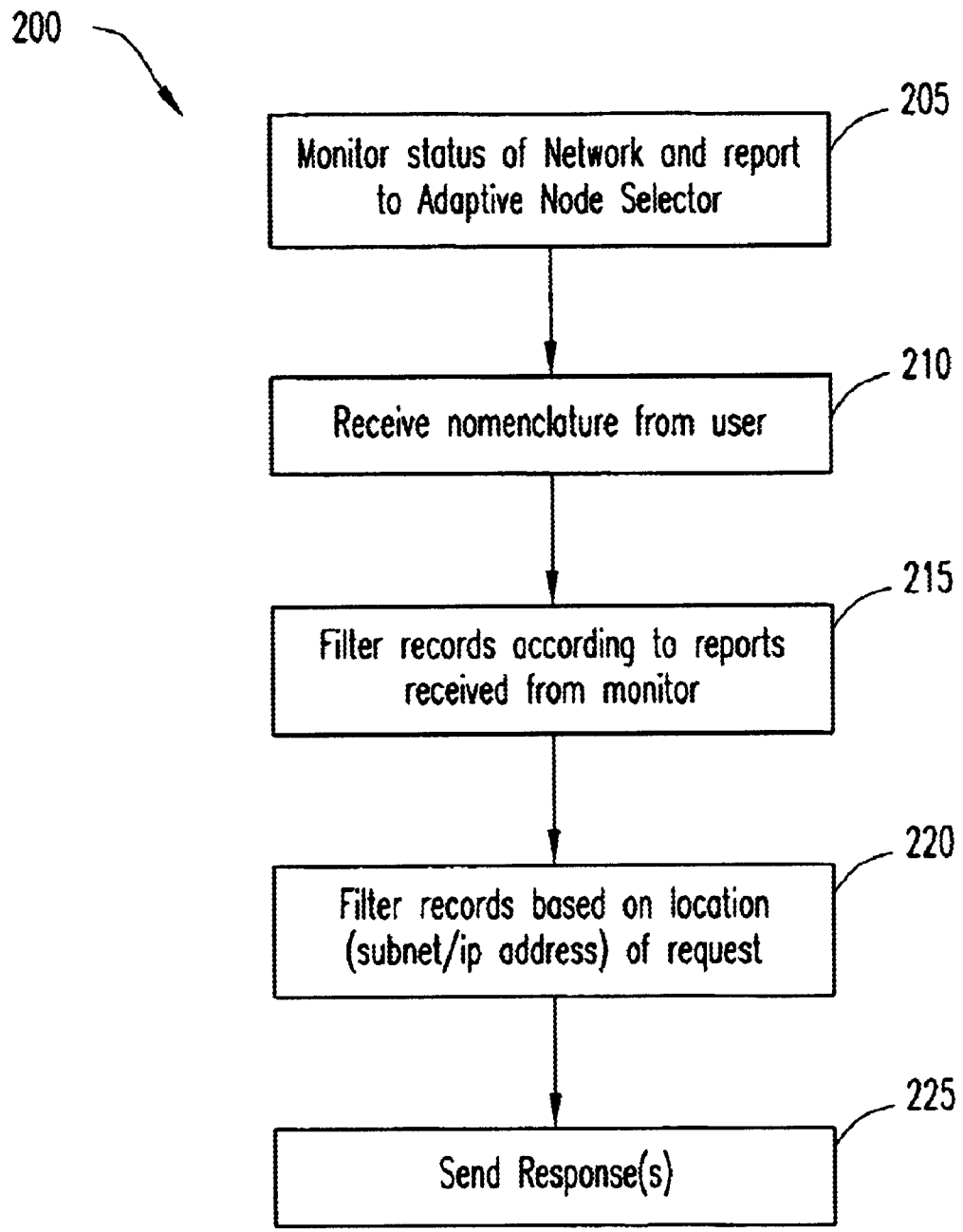
FIG. 2 illustrates exemplary functional blocks for adaptive node selection in accordance with the present invention.

Referring now to FIG. 2, exemplary functional blocks for adaptive node selection in accordance with the present invention are illustrated generally at 200. The exemplary functional blocks 200 illustrate multiple functions that may be effectuated in order to provide a listing of links/node(s) for routing a communication, in which the listing excludes some (if not all) node(s) that such a communication cannot be routed through. The condition of various links/nodes (e.g., as representable by key IP addresses of the desired and/or appropriate nodes and their respective links) within the network or networks, between networks, etc. are monitored and reported to an adaptive node selector (block 205). Monitoring, whether active or a passive, may occur at periodic intervals, substantially constantly (e.g., running in the background, as reports are received, etc.), etc.

When a nomenclature is received from a user (e.g., via a network node) (block 210), node(s) associated with the nomenclature and having link(s) being monitored are ascertained. The viability of the node(s) themselves that are associated with the nomenclature may also be ascertained and considered. A network link monitor may, for example, monitor the network by receiving functioning/non-functioning reports from the network automatically, by polling the network, by probing the network, etc. For example, a network link monitor may send ICMP echo request packets to the IP addresses of the Gn and Gi router boards/interfaces and may alternatively also probe the application boards to ensure that a GTP tunnel/session can be established between the SGSN and the GGSN. Link monitoring/probing alone only ensures that a link/interface is available/up to/from the GGSN nodes. The network monitor tool may also send out probes. For example, it may send probes to the router and application boards/processors accordingly at, e.g., set intervals by sending X (X=can be set by the operator via the GUI) number of ICMP echo packets to designated IP addresses, which can also be set by the operator via the GUI or CLI interfaces. The probes may alternatively be sent out under a varying timing scheme, and/or responsive to noted problems, etc.

The network monitor may send out X number of probes at different Y time intervals. This allows for convergence of the network in case of path/link failure or redundancy in case of a probe failing to reach its destination. An operator may be given the option to set the distinct path the probes are to traverse. The probe may also be applied to test the application boards/processors used for GTP tunnel termination and creation for control, signaling, and/or payload.

The records are filtered (block 215) based upon information reported from the monitor and the nomenclature received from the user. Addresses for systems that are unavailable/down are filtered from the responses returned. Records are grouped, for example, based upon site of architecture, and they are filtered according to location (and/or similar services, similar capacities, etc.) (block 220) of Site queries that were received. The records may further be listed in order of preference. The network monitor may also participate in Dynamic Routing protocols, such as OSPF/RIP and BGP for example, and gather information accordingly, which may be used for the filtering of records.

After ascertaining node(s) having connectivity potential (e.g., based on the most recent monitoring record(s)) (of blocks 205/215), and optionally after location-based selecting, grouping and/or preference ordering (of block 220), the nodal addresses of the ascertained node(s) are sent towards the user (e.g., to the node from which the request was sent and/or originated) (block 225). It should be understood that the various functions need not be completed (or started) in the order illustrated in the exemplary functional blocks 200. For example, the filtering block 215 may be accomplished prior to or at least substantially contemporaneously with the ascertainment of node(s) having at least acceptable connectivity potential and location-based relevance, where a combination of both may be used to return an acceptable answer at that instant in time.

As noted hereinabove, principles of the present invention may be advantageously applied to and employed in, for example, GPRS networks. As another example, principles of the present invention may be advantageously applied to and employed in 3G networks as well. In GPRS networks, two types of network nodes are: (i) a Serving GPRS Support Node (SGSN), which is essentially an access point to the (e.g., core) packet data network and (ii) a Gateway GPRS Support Node (GGSN), which is essentially a gateway to external packet data networks (e.g., an ISP, a corporate network, etc.). The SGSN forms a DNS query from the active PDP context that the MS initiated and sends out the DNS query to locate the GGSN(s) that are connected to the access point name (APN) requested from the MS.

GPRS/3G embodiments of the present invention, for example, make the DNS more dynamic and enable it to, at least partially converge within the network by monitoring the current status of the GGSNs' Gn and Gi interfaces/links and/or Servers such as RADIUS and DHCP, and/or by taking the necessary action(s) accordingly. An adaptive node selector may monitor key IP addresses in the network and dynamically update its records accordingly due to changes in the current status of the network nodes and/or links. Consequently, an adaptive node selector may return only valid GGSN IP addresses that are currently up/available (contacted to/from the requesting SGSN where the DNS query was received) and available for connection to the desired external PDN. In other words, to remedy at least some of the problems resulting from the static nature of a traditional DNS, a GPRS adaptive node selector is described herein as a replacement to the traditional DNS currently used in GPRS and 3G networks. Additionally, in certain embodiment(s), a GPRS adaptive node selector (i.e., an adaptive DNS) may detect who the requester is (i.e., the location/origin of the SGSN where the DNS query/request came from) and use that information to map/select/filter appropriate GGSNs for that APN, based upon location-based APN selection.

Figure 3:
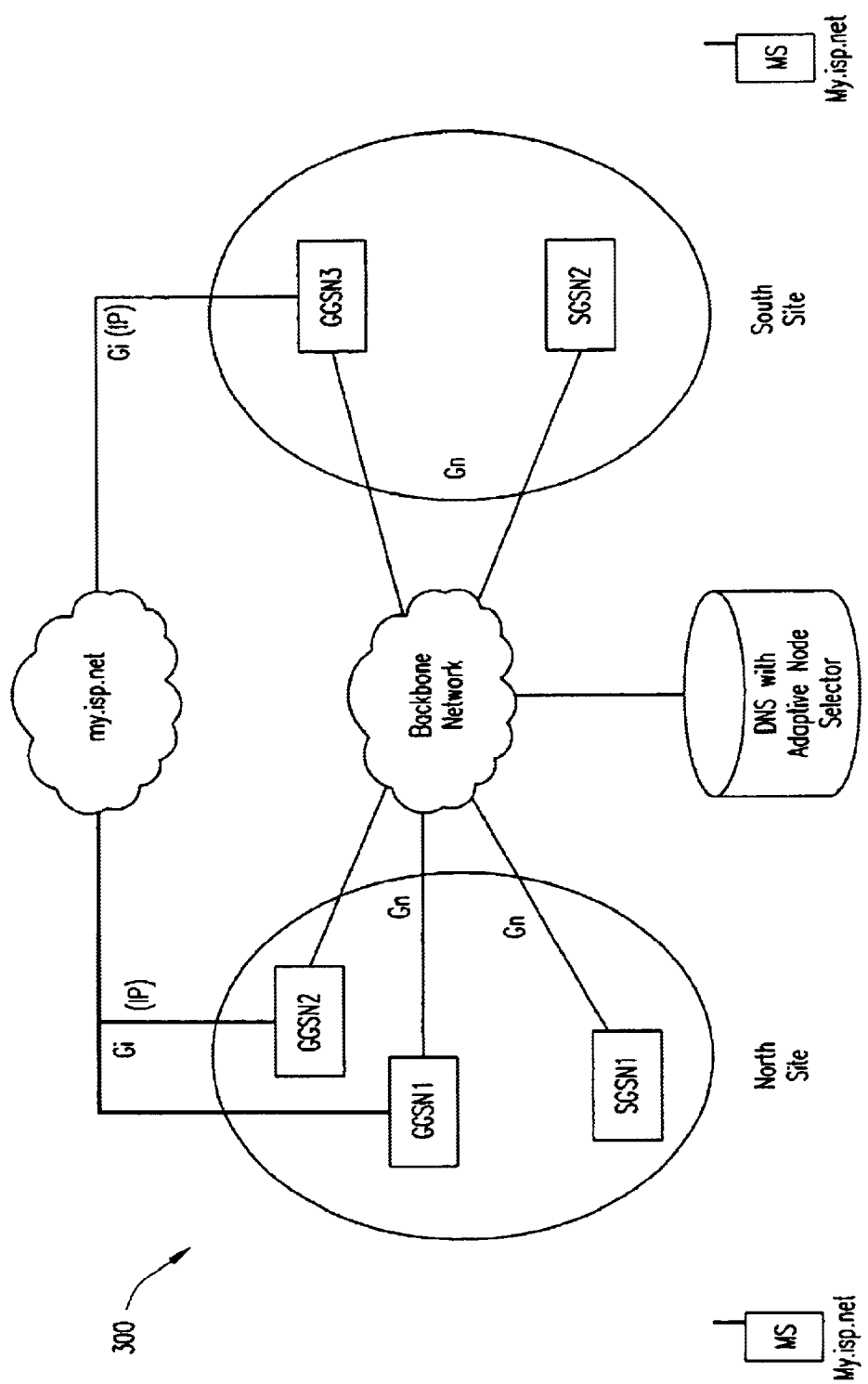
FIG. 3 illustrates an exemplary GPRS network environment using an exemplary DNS server having adaptive node selection in accordance with the present invention.
Figure 4:
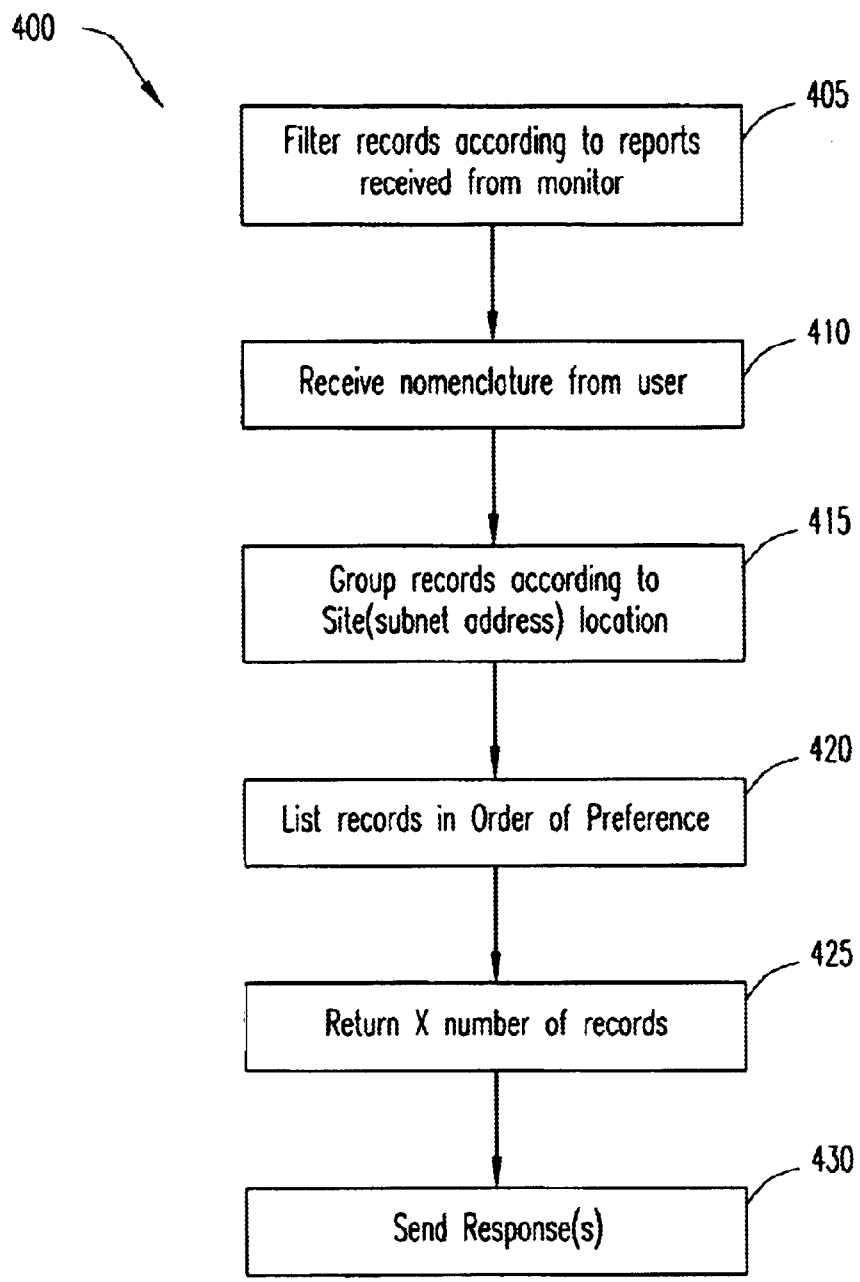
FIG. 4 illustrates additional exemplary functional blocks for adaptive node selection including location-based filtering in accordance with the present invention.

It should be understood that the network elements of FIG. 1 may differ from the network elements of the succeeding FIGS. 2–4 in as much as the network elements of the succeeding FIGS. 2–4 may be modified in accordance with the principles of the present invention as described herein. For example, the GGSNs of FIG. 3 may be specially modified to test the functioning and/or the connectivity ability of themselves by monitoring/probing and/or of the attached Gi/Gn link, as well as reporting it to an adaptive node selector. FIGS. 2–4, as well as the related text, facilitate the explanation and understanding of certain embodiment(s) in accordance with the present invention, of some exemplary network scenarios, and of how an adaptive node selector improves the network's connectivity, location-based APN resolution, and redundancy response(s) thereto.

An adaptive node selector may monitor, e.g., key IP addresses on the Gn and Gi links and the respective nodes/network elements, and update its database accordingly. This can at least partially alleviate difficulties arising from when a standard DNS server returns all possible results to a requested APN inasmuch as the adaptive node selector need only return the results for the entries it considers as available/alive/up. The adaptive node selector monitors the Gn and Gi interfaces/links of the GGSN nodes and filters out entries it regards as unavailable/down because it has lost the ability to communicate with the GGSN node as a result of its Gn and/or Gi links being unavailable/down.

The Gn links need to be monitored so as to prevent the adaptive node selector from returning entries, for the APN requested from the SGSN on behalf of the MS, that are no longer valid entries, since the connection to that GGSN is no longer available/up to its Gn interface/link. The Gi link also needs to be monitored because when the Gn link is active and a GTP tunnel/session is to be established, it may be that the Gi links/interfaces are unavailable/down. Consequently, in these situations, even though a GTP connection to the GGSN and the PDP context may have been established, there is still no ability to send or receive data because the connection to the external PDN specified is unavailable/down on the Gi interface/link. Furthermore, in certain embodiment(s), even after the adaptive node selector has taken action based upon results it has gathered from its monitoring functionality(ies) indicating that the links/interfaces/nodes are available/up, the adaptive node selector still checks that the application is available on the GGSN for GTP connectivity by probing the application boards where GTP session is being or is to be achieved (e.g., where the GTP tunnel is created and terminated).

An APN filter/swapping/preference-selection tool may optionally be used to select certain "A" records and return them to the SGSN based on the location/origin of the source address of the DNS request and the APN requested. It relates to the IP address of the node sending the DNS request and the APN requested, and it then returns the nearest GGSN IP addresses, if available/up, or the next one in the preference list based on the location of the DNS query/request. This makes an adaptive mobile DNS, which includes this feature, respond to queries that can be thought of as regionally/location based. Another optional aspect of certain embodiment(s) includes a local or remote manageability, where an adaptive mobile DNS may be managed locally or remotely via simple network management protocol (SNMP) or TELNET, for example.

Referring now to FIG. 3, an exemplary GPRS network environment using an exemplary DNS server having adaptive node selection in accordance with the present invention is illustrated generally at 300. In the exemplary GPRS network environment 300, an MS in the North Site is illustrated as being in wireless communication with an SGSN, namely the SGSN1. The two (2) illustrated SGSNs (e.g., SGSN1 and SGSN2) and the three (3) illustrated GGSNs (e.g., GGSN1, GGSN2, and GGSN3) are illustrated as being connected to the backbone network of the GPRS network via Gn links/interfaces. GGSN1 and GGSN2 in the North Site and GGSN3 in the South Site are illustrated as being connected to an external PDN (e.g., "my.isp.net") via Gi links/interfaces. The Gi links may be compatible with, for example, the Internet protocol (IP). An exemplary DNS having adaptive node selection is illustrated as being connected to the backbone network of the GPRS network and having connectivity to the Gn and Gi interfaces of the three GGSNs (e.g., GGSN1, GGSN2 and GGSN3) and their respective end hosts (e.g., servers such as DHCP and RADIUS, which may instead be thought of as supporting nodes). The adaptive node selector may include other hardware to carry out its standard and described functions such as a work station (WS).

With continuing reference to the exemplary GPRS network environment 300, assume, by way of example only, that the adaptive node selector is configured with the "A" records for multiple APNs, including the APN "my.isp.net", and that it returns the IP address of the GGSNs that it considers as available/up when a query therefor is received. Further, assume that during a given time period that the Gn link/interface on the GGSN1 node and the Gi link/interface on the GGSN3 node have gone down. Also assume that both the Gi link and the Gn link on the GGSN2 in the North Site are available/up, meaning that the SGSNs SGSN1 and SGSN2 can reach the GGSN2 and furthermore the external PDN "my.isp.net" via the GGSN2.

In this example, for an MS located in the North Site connected to the SGSN1 in the North Site, and with an adaptive node selector and the status of the Gn and Gi links/interfaces of the respective network nodes as described above, the following network scenario may occur:

(1) The MS requests the APN "my.isp.net".

(2) The SGSN1 receives this request and sends it to the adaptive node selector in the GPRS backbone.

(3) The adaptive node selector of the DNS responds with IP address(es) of GGSN2 as the only result because it is the only possible available/up GGSN (as illustrated and given the assumptions listed above) because the monitor reported both its Gn and Gi interfaces available and up. A monitor probe (or similar technique or scheme) detected that the Gn link(s)/interfaces on GGSN1 were down/unavailable, and as a result, the adaptive mobile DNS filtered the A record for GGSN1, and did not return the IP address of GGSN1 in the DNS response to the DNS/APN query. The monitor probe acted similarly with respect to GGSN3 and the Gi link(s)/interfaces, which are unavailable/down. Also, the adaptive node selector realizes that the DNS query came from the SGSN1 in the North Site, and it returns the IP address of the GGSN2 as the most suitable GGSN based on the location of the SGSN that is looking for APN resolution for that A record (and also as both of GGSN2's Gn and Gi interfaces/links are available/up).

(4) The SGSN1 then initiates GTP signaling towards the GGSN2, using the IP address that the adaptive node selector returned, and successfully establishes a GTP tunnel/session to the GGSN2.

(5) The MS may then begin to transfer data to and receive data from the requested network as represented by "my.isp.net".

Now assume, by way of example only, that the GGSN3 has managed to bring back its Gi interfaces/links. In this example, the SGSN2 in the South Site sends a DNS request for the APN "my.isp.net" (that the MS specified in the PDP Context Activation) to the adaptive node selector. The adaptive node selector has collected and organized the current status of the network from its monitor function. The monitor function has reported that GGSN2 and GGSN3 have both their Gn and Gi interfaces/link available/up and that GGSN1 has its Gn interfaces unavailable/down.

As a result, the adaptive node selector has the option to return multiple IP addresses, namely the IP addresses of GGSN2 and GGSN3 for the APN requested (i.e., "my.isp.net"). However, the adaptive node selector notices that the request for this APN came from SGSN2 in the South Site and consequently returns the IP address of GGSN3 to SGSN2 and filters out the IP address of GGSN2. The SGSN2 subsequently attempts to establish a GTP session/tunnel with GGSN3 and is successful. The MS may then begin to transfer data to and receive data from the requested network "my.isp.net".

Now assume, by way of example only, that the GGSN3 has its Gi interfaces/links unavailable/down, the GGSN1 has its Gn links/interfaces unavailable/down and the GGSN2 has both its Gn and Gi interfaces available/up. In this example, an MS that is currently attached to the SGSN2 in the South Site has requested the APN "my.isp.net" in its PDP Context Activation. The SGSN2 in the South Site sends a DNS request for the APN "my.isp.net" that the MS specified to the adaptive node selector.

The adaptive node selector has collected and organized the current status of the network from its monitoring function. The adaptive node selector returns the IP address of GGSN2 because the local GGSN near where the DNS request originated from SGSN2, namely the GGSN3 in the South Site, is not available/up and is therefore filtered out.

This results in all unavailable GGSNs (namely, GGSN1 and GGSN3) being filtered out, and because the local GGSN (namely GGSN3) is filtered out, the adaptive node selector returns the IP address of GGSN2 to SGSN2. Thus, the MS can connect to the external PDN, even though the GGSN2 is not in the same Site as SGSN2 or the MS. In other words, the adaptive node selector first received the DNS query from SGSN2 looking for the APN "my.isp.net" to be resolved. After receiving the address of the GGSN2 from the adaptive node selector, the SGSN2 attempts to establish a GTP session/tunnel with the GGSN2. The SGSN2 is successful. The MS may then begin to transfer data to and receive data from the requested network "my.isp.net".

Referring now to FIG. 4, additional exemplary functional blocks for adaptive node selection including location-based filtering in accordance with the present invention are illustrated generally at 400. The exemplary functional blocks of the diagram 400 include a record filter 405, a selected input from user 410, a group record selection 415, an order of preference response filter 420, and a return X number of records functional block 425.

The adaptive node selection filters records according to reports received from a monitoring function (at block 405). Once a nomenclature is received from a user (at block 410), the records may be grouped (e.g., according to site location using, for example, a subnet address) (at block 415). In other words, the function of block 415 may be used to place "A" records in a group according to their location in the GPRS network (i.e., into a particular Site of a multiple site GPRS network).

The listing of records in order of preference function (block 420) may be used to return records in a preferred list. For example, if a DNS query comes from Site 1 and all GGSN nodes in Site 1 are unavailable/down, then the adaptive node selector returns the next most-preferred GGSNs that are available (e.g., still based on location) in another site, for example. The return X number of records function (block 425) may be used to limit the number of available/up GGSN IP addresses that are to be returned. The one or more response(s) are sent function (block 430) is then activated to send the X number of records to the inquiring SGSN node.

Although embodiment(s) of the methods, systems, and arrangements of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for providing adaptive gateway node selection in a general packet radio service (GPRS) network wherein said GPRS network includes a plurality of gateway GPRS support nodes (GGSN), each GGSN including Gn interface and a Gi interface for communicating with others communications nodes, comprising the steps of:

monitoring a Gn interface or Gi interface associated with at least one GGSN of said plurality of GGSNs;

detecting that said Gn interface or Gi interface associated with said at least one GGSN is non-connective;

receiving a mapping request, the mapping request including at least one nomenclature;

mapping the at least one nomenclature to one or more of said plurality of GGSNs using an entry of a data structure responsive to said step of receiving a mapping request;

filtering at least one field of the entry of the data structure based, at least in part, on said step of detecting wherein said step of filtering further comprises the step of omitting a network address of said at least one GGSN with said non-connective interface from a response to the mapping request.

2. The method according to claim 1, wherein said step of monitoring at least one GGSN comprises the step of actively polling the at least GGSN over said Gn interface or Gi interface.

3. The method according to claim 1, wherein said step of monitoring at least one GGSN comprises the step of probing a key Internet protocol (IP) address for the at least one GGSN.

4. The method according to claim 1, wherein the at least one nomenclature comprises a domain name.

5. The method according to claim 1, wherein said step of receiving a mapping request comprises the step of receiving a domain name system (DNS) query/request from at least one of a serving general packet radio service (GPRS) support node (SGSN) and another DNS server.

6. The method according to claim 1, further comprising the steps of:

detecting that the Gn interface and Gi interface associated with said at least one GGSN is connective again;

enabling the at least one field of the entry of the data structure for responses to mapping requests;

receiving another mapping request, the another mapping request including the at least one nomenclature;

mapping the at least one nomenclature to one or more GGSNs using the entry of the data structure responsive to said step of receiving another mapping request;

including the network address of the at least one GGSN in another response to the another mapping request responsive, at least partially, to said step of enabling.

7. The method according to claim 1 further comprising the step of:
filtering a plurality of GGSNs that may be mapped to the at least one nomenclature based, at least partially, on at least one of a location and an origin of the mapping request.

8. The method according to claim 7, wherein a site location of a node that originated the mapping request is utilized in said step of filtering.

9. The method according to claim 7, wherein said step of filtering is executed at least one of (i) prior to, (ii) at least partially overlapping with, and (iii) after execution of said step of mapping the at least one nomenclature to a GGSN using an entry of a data structure.

10. A method for providing adaptive gateway node selection in a general packet radio service (GPRS) network wherein said GRPS network includes a plurality of gateway GPRS support nodes (GGSN) each of said GGSNs associated with a Gn and Gi interfaces, comprising the steps of:
monitoring a plurality of said Gn and Gi interfaces;
determining that a particular one of said plurality of Gn or Gi interface is down;
determining a particular GGSN associated with said downed Gn or Gi interface;
receiving a domain name request from a serving GPRS support node (SGSN), the domain name request including a domain name;
ascertaining an association between the domain name and one or more of said plurality of GGSNs; and
formulating a domain name response based, at least partly, on said steps of ascertaining, wherein said determined GGSN with the downed interface is removed from said response in the event said determined GGSN is ascertained as being associated with said domain name.

11. The method according to claim 10, wherein said step of monitoring a plurality of said Gn and Gi interfaces comprises the step of monitoring key Internet protocol (IP) addresses.

12. The method according to claim 10, wherein said step of ascertaining an association between the domain name and one or more of said plurality of GGSNs
further comprising the step of:
selecting one of said plurality of GGNS based, at least partly, on the location of the SGSN requesting the domain name request.

13. A system for implementing an active mobile domain name server (DNS) within a general packet radio service (GPRS) network, comprising:
means for monitoring a plurality of gateway GPRS support nodes (GGSN), each identifiable by a key Internet protocol (IP) address and further associated with a Gn interface and Gi interface;
means for maintaining a database, the database having a plurality of entries, each entry including a particular domain name and one or more network addresses associated with one or more GGSNs, said means for maintaining a database further marking a particular entry as being unavailable if said means for monitoring determines that the at least one of said Gn interface or Gi interface associated with a particular GGSN associated with said particular entry as being downed;

means for receiving a domain name request having a domain name from another network node within said GPRS network; and
means for responding to the domain name request with a domain name response, the domain name response including network address associated with one or more GGSNs that are associated with the domain name in the database and whose corresponding entry is not marked as unavailable.

14. The system according to claim 13, further comprising:
means for filtering the plurality of GGSNs within said domain name response based on the location of said another network node requesting the domain request.

15. A method for adaptively routing communications in a general packet radio service (GPRS) network, comprising the steps of:
monitoring at least one of Gn and Gi interfaces/links to detect an interface/link failure, each of the at least one of Gn and Gi interfaces/links coupled to at least one gateway GPRS support node (GGSN) of a plurality of GGSNs;
maintaining a database that includes a plurality of entries, each entry of the plurality of entries associating a domain name of a plurality of domain names with at least one GGSN, and its respective Internet protocol (IP) address, of the plurality of GGSNs;
filtering out IP addresses of GGSNs in relation to the at least one of Gn and Gi interfaces/links that have been detected as in failure;
receiving a request from a serving GPRS support node (SGSN) that includes a domain name;
mapping the domain name to at least one entry and its respective IP address using at least one entry of the database;
formulating a response, the response listing at least one GGSN to be sent to the SGSN, using the at least one entry from said step of mapping but omitting any IP address or addresses of GGSNs that are filtered out by said step of filtering.

16. An arrangement for providing adaptive gateway node selection in a general packet radio service (GPRS) network, comprising:
a database, said database including a plurality of entries, each entry of the plurality of entries including a nomenclature, an associated gateway GPRS support node (GGSN) network address, and an associated validity field;
a network monitor, said network monitor configured to monitor a Gn and Gi interfaces coupled to said GGSNs associated with said plurality of entries within said database and detect unavailability thereof, said network monitor adapted to determine a GGSN network address corresponding to a particular Gn or Gi interface having unavailability detected thereof, said network monitor further adapted to mark as invalid the validity field associated with said entry within said database for said determined GGSN network address;
at least one response logic module, said at least one response logic module adapted to receive nomenclature requests having received nomenclatures, apply the received nomenclatures to said database, retrieve those GGSN network addresses that are associated with a particular received nomenclature and that do not have an associated validity field marked as invalid, and prepare a nomenclature response therefrom, the nomenclature response including at least one GGSN network address.

17. The method according to claim 16, wherein said step of monitoring said Gn and Gi interfaces comprises the step of passively collecting information regarding route availability that is being broadcast over the GPRS network.

18. The method according to claim 17, wherein said step of passively collecting information regarding route availability that is being broadcast over the GPRS network comprises the step of participating in Open Shortest Path First/Routing Information Protocols/Border Gateway Protocol (OSPF/RIP/BGP) route monitoring.

* * * * *